(12) United States Patent
Perez Barrera et al.

(10) Patent No.: US 10,160,459 B2
(45) Date of Patent: Dec. 25, 2018

(54) VEHICLE LANE DIRECTION DETECTION

(71) Applicant: Ford Global Technologies, LLC, Dearborn, MI (US)

(72) Inventors: Oswaldo Perez Barrera, Texcoco (MX); Alvaro Jimenez Hernandez, Miguel Hidalgo (MX); Francisco Javier Ferreira, Atizapna de Zaragoza (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/466,276

(22) Filed: Mar. 22, 2017

(65) Prior Publication Data

US 2018/0273048 A1    Sep. 27, 2018

(51) Int. Cl.
| | |
|---|---|
| *B60W 10/10* | (2012.01) |
| *B60W 10/18* | (2012.01) |
| *B60W 10/30* | (2006.01) |
| *B60W 30/14* | (2006.01) |
| *B60W 40/04* | (2006.01) |
| *B60W 50/00* | (2006.01) |
| *B60W 50/08* | (2012.01) |

(52) U.S. Cl.
CPC ........ *B60W 50/0098* (2013.01); *B60W 10/10* (2013.01); *B60W 10/18* (2013.01); *B60W 10/30* (2013.01); *B60W 40/04* (2013.01); *B60W 50/082* (2013.01); *B60W 30/14* (2013.01); *B60W 2420/52* (2013.01); *B60W 2420/54* (2013.01); *B60W 2540/20* (2013.01); *B60W 2550/141* (2013.01); *B60W 2550/22* (2013.01)

(58) Field of Classification Search
CPC .......... B60W 50/0098; B60W 50/082; B60W 10/30; B60W 10/18; B60W 2540/20; B60W 2550/22
See application file for complete search history.

(56) References Cited

U.S. PATENT DOCUMENTS

| | | | | |
|---|---|---|---|---|
| 5,203,422 A | * | 4/1993 | Estep | ........................ B60T 7/22 180/169 |
| 2008/0238718 A1 | | 10/2008 | Jung | |
| 2011/0106376 A1 | | 5/2011 | Tijerina et al. | |

(Continued)

FOREIGN PATENT DOCUMENTS

| | | |
|---|---|---|
| DE | 19934774 A1 | 2/2001 |
| DE | 10219904 A1 | 4/2004 |

(Continued)

OTHER PUBLICATIONS

Zhang, Dengsheng, et al., A Comparative Study of Fourier Descriptors for Shape Representation and Retrieval; ACCV2002: The 5$^{th}$ Asian Conference on Computer Vision; Melbourne, Australia; Jan. 23-25, 2002; 6 pages.

(Continued)

*Primary Examiner* — Michael J Zanelli
(74) *Attorney, Agent, or Firm* — Frank A. MacKenzie; Bejin Bieneman PLC (57) ABSTRACT

A roadway lane direction is identified based on vehicle sensor data of a traffic sign, a direction of a parked vehicle, and a marking on a surface of the roadway lane. A trajectory of a vehicle is determined to differ from the roadway lane direction, and a vehicle component is then actuated.

20 Claims, 6 Drawing Sheets

(56) References Cited

U.S. PATENT DOCUMENTS

| | | | | |
|---|---|---|---|---|
| 2011/0121992 | A1* | 5/2011 | Konaka | B62D 15/029 |
| | | | | 340/905 |
| 2013/0096767 | A1 | 4/2013 | Rentschler et al. | |
| 2013/0144486 | A1* | 6/2013 | Ricci | H04W 4/90 |
| | | | | 701/36 |
| 2014/0350837 | A1 | 11/2014 | Galbas et al. | |
| 2015/0307131 | A1 | 10/2015 | Froeschl | |
| 2015/0360610 | A1 | 12/2015 | Reed et al. | |
| 2016/0217688 | A1* | 7/2016 | Jeschke | G06K 9/00798 |
| 2016/0343253 | A1* | 11/2016 | Imai | G06K 9/00818 |
| 2017/0003134 | A1* | 1/2017 | Kim | B60R 1/00 |
| 2017/0371343 | A1* | 12/2017 | Cohen | G05D 1/0246 |

FOREIGN PATENT DOCUMENTS

| | | |
|---|---|---|
| DE | 10359965 A1 | 7/2004 |
| EP | 1327968 B1 | 12/2002 |
| EP | 1840860 A1 | 3/2007 |
| WO | 2016020092 A1 | 2/2016 |

OTHER PUBLICATIONS

Jorge, Joaquim A., et al., "A Simple Approach to Recognise Geometric Shapes Interactively," Departamento de Engenharia Informatica, Lisboa, Portugal; Feb. 3, 2000; 8 pages.

Vijayenthiran, Viknesh, "Mercedes' New Safety Tech Aims to End Wrong-Way Driving," Popular Science, Jan. 29, 2013; 2 pages.

Search Report from United Kingdom Intellectual Property Office dated Sep. 3, 2018 regarding Application No. GB1804147.5 (4 pages).

* cited by examiner

VEHICLE LANE DIRECTION DETECTION

BACKGROUND

Roadway lanes typically restrict vehicle travel to a single direction. For example, in the United States, the right-most roadway lane is designated for forward-moving vehicle travel. When a roadway has a single roadway lane, the roadway lane may be designated with a single direction of travel, i.e., a one-way roadway. Vehicles operated partly or entirely without user input may have difficulty identifying the direction of travel for a roadway lane while enroute.

DETAILED DESCRIPTION

A system includes a computer programmed to identify a roadway lane direction based on vehicle sensor data indicating one or more of a traffic sign, a direction of a parked vehicle, and a marking on a surface of the roadway lane, to determine that a trajectory of a vehicle differs from the roadway lane direction, and then actuate a vehicle component.

The computer can be further programmed to determine the direction of the parked vehicle based on at least one of a rear-facing feature and a front-facing feature of the parked vehicle.

The computer can be further programmed to determine the direction of the traffic sign based on a comparison of a predetermined image of the traffic sign and a current image of the traffic sign.

The computer can be further programmed to identify the roadway lane direction from a direction of the traffic sign.

The vehicle component can be a hazard light. The vehicle component can be a brake or a gear selector.

The vehicle component can be a transmitter and the computer can be further programmed to send a message to an owner of the vehicle indicating that the trajectory of the vehicle differs from the roadway lane direction. The vehicle component can be a transmitter and the computer can be further programmed to send a message indicating the lane direction to another vehicle.

The computer can be further programmed to determine the direction of the parked vehicle based on an image of the parked vehicle.

The computer can be further programmed to return control of the vehicle component to a human operator upon determining that the trajectory of the vehicle differs from the roadway lane direction.

A method includes identifying a roadway lane direction based on vehicle sensor data indicating one or more of a traffic sign, a direction of a parked vehicle, and a marking on a surface of the roadway lane, and determining that a trajectory of a vehicle differs from the roadway lane direction and then actuating a vehicle component.

The method can further include determining the direction of the parked vehicle based on at least one of a rear-facing feature and a front-facing feature of the parked vehicle.

The method can further include determining the direction of the traffic sign based on a comparison of a predetermined image of the traffic sign and a current image of the traffic sign.

The method can further include determining the lane direction based on a direction of the traffic sign.

The vehicle component can be a transmitter and the method can further include sending a message to an owner of the vehicle indicating that the trajectory of the vehicle differs from the roadway lane direction. The vehicle component can be a transmitter and the method can further include sending a message indicating the lane direction to another vehicle.

The method can further include determining the direction of the parked vehicle based on an image of the parked vehicle.

The method can further include returning control of the vehicle component to a human operator when the trajectory of the vehicle differs from the roadway lane direction.

Further disclosed is a computing device programmed to execute any of the above method steps. Yet further disclosed is a vehicle comprising the computer. Yet further disclosed is a computer program product, comprising a computer readable medium storing instructions executable by a computer processor, to execute any of the above method steps.

As used herein, a "lane direction" is a direction of traffic in a roadway lane. That is, travel in a specific direction is typically specified for a given roadway lane. This specific direction is the "lane direction." For example, on a two-lane roadway, the roadway lanes can have opposing lane directions, allowing for travel in two directions along the roadway. When a roadway has a single roadway lane and the lane direction is specified, the roadway is a "one-way" roadway.

Figure 1:
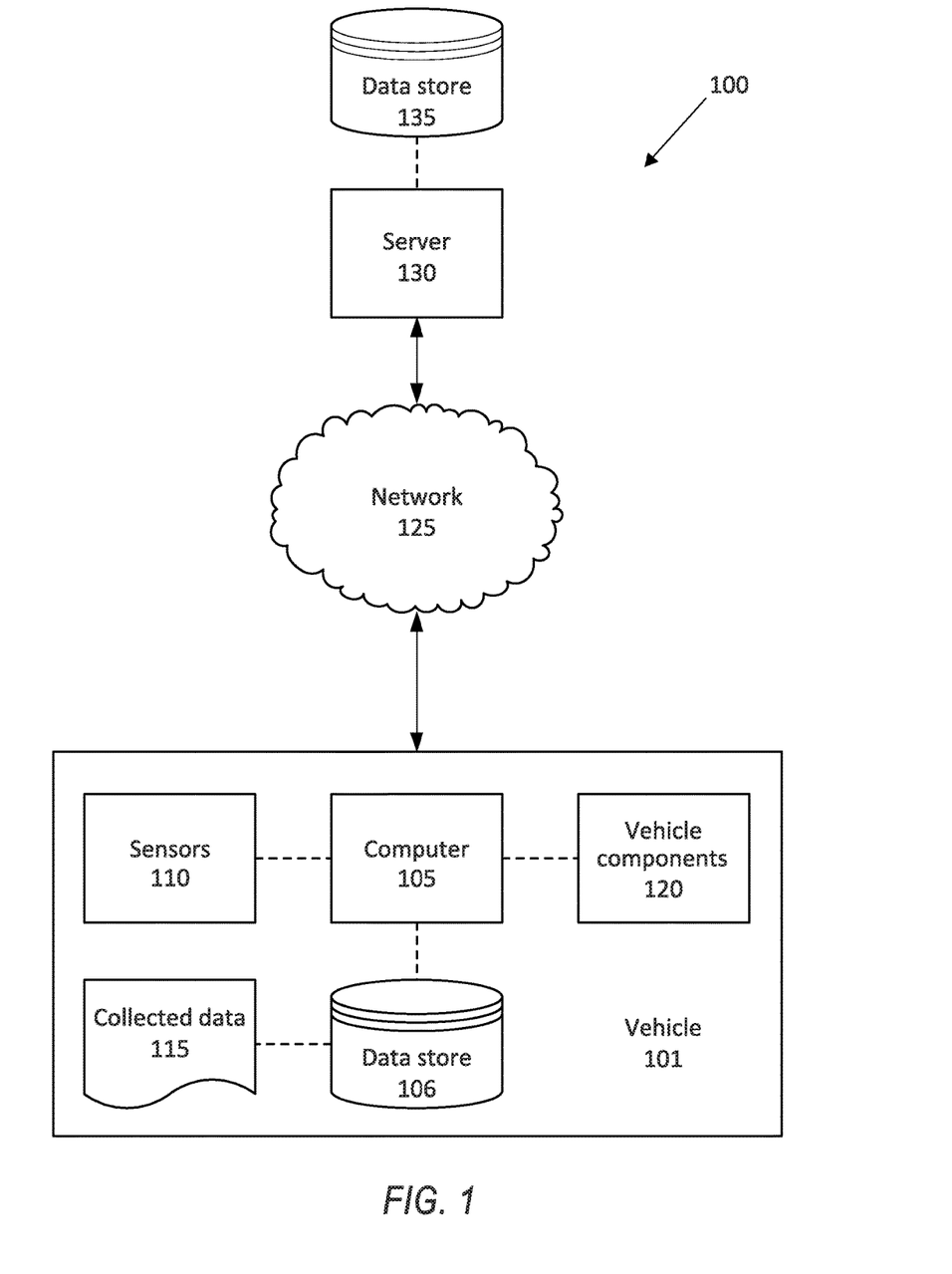
FIG. 1 is a block diagram of an example system for identifying a lane direction.

FIG. 1 illustrates a system 100 for operating a vehicle 101 in a roadway lane. A computer 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus (e.g., Controller Area Network or CAN), as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth, wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation-such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, and the like.

The computer 105 may actuate the components 120 to, e.g., brake and/or slow and/or stop the vehicle 101, to avoid targets, etc. The computer 105 may be programmed to operate some or all of the components 120 with limited or no input from a human operator, i.e., the computer 105 may be programmed to operate the components 120. When the computer 105 operates the components 120, the computer 105 can ignore input from the human operator with respect to components 120 selected for control by the computer 105, which provides instructions, e.g., via a vehicle 101 communications bus and/or to electronic control units (ECUs) as are known, to actuate vehicle 101 components, e.g., to apply brakes, change a steering wheel angle, etc. For example, if the human operator attempts to turn a steering wheel during steering operation, the computer 105 may ignore the movement of the steering wheel and steer the vehicle 101 according to its programming.

When the computer 105 operates the vehicle 101, the vehicle 101 is an "autonomous" or semi-autonomous vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105 and not a human operator. A semi-autonomous mode is one in which at least one of vehicle 101 propulsion (typically via a powertrain including an electric motor and/or internal combustion engine), braking, and steering are controlled at least partly by the computer 105 as opposed to a human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE) IEEE 802.11, vehicle-to-vehicle (V2V) such as Dedicated Short Range Communications (DSRC), etc.), local area networks (LAN) and/or wide area networks (WAN), including the Internet, providing data communication services.

The computer 105 is programmed to identify a roadway lane direction and to determine whether the trajectory of the vehicle 101 differs from the roadway lane direction, i.e., the vehicle 101 is moving in the roadway lane in a direction opposite to, and/or otherwise differing from, the identified roadway lane direction. That is, the trajectory of the vehicle 101 "differs" from the lane direction when an angle defined by the trajectory of the vehicle 101 and the lane direction exceeds a predetermined threshold. For example, when the trajectory of the vehicle 101 is more than 90 degrees away from the lane direction, the computer 105 can determine that the vehicle 101 is moving against the lane direction and may collide with another vehicle 101 moving along the lane direction, i.e., the trajectory of the vehicle 101 differs from the lane direction. When the trajectory of the vehicle 101 differs from the roadway lane direction, the computer 105 is programmed to actuate one or more countermeasures to correct the trajectory of the vehicle 101 and mitigate potential collisions.

The computer 105 can actuate one or more countermeasure upon determining that the vehicle 101 is moving opposite the roadway lane direction, i.e., the vehicle 101 is moving the wrong way in the current roadway lane. The computer 105 can actuate a hazard light, indicating to other vehicles 101 that the vehicle 101 is moving in the wrong direction.

The computer 105 can send a message to an owner of the vehicle 101 over the network 125 indicating that the vehicle 101 is moving in the wrong direction in the roadway lane. That is, when the vehicle 101 is operating in the autonomous mode, the vehicle 101 can travel without the owner present in the vehicle 101. Thus, the owner may not be present when the vehicle 101 is moving in the wrong direction in the roadway lane. Furthermore, the vehicle 101 can return to a partially autonomous or a manual mode, i.e., the computer 105 can return control of the vehicle components 120 to an operator of the vehicle 101.

The computer 105 can actuate a brake to stop the vehicle 101 in the roadway lane. Upon stopping, the computer can move a gear selector to a reverse position to move the vehicle 101 out of the current roadway lane and/or turn the vehicle 101 around to face the correct direction. By actuating the brake and moving the gear selector to the reverse position, a first vehicle 101 can avoid a potential collision with a second moving toward the vehicle 101; the second vehicle may or may not be a second vehicle 101, i.e., may or may not include a computer 105, data store 106, sensors 110, data 115, and components 120 as described above.

The computer 105 in a first vehicle 101 can send a message indicating the lane direction to one or more other vehicles, e.g., a second vehicle 101. That is, prior to the identification of the lane direction from a vehicle 101, other autonomous vehicles 101 may attempt to move opposite the lane direction in the roadway lane. Once the first vehicle 101 identifies the lane direction in the roadway lane, the computer 105 can send a message over the network 125 to the server 130 and/or other vehicles 101 indicating the lane direction to prevent the other autonomous vehicles 101 from moving the wrong way in the roadway lane. Furthermore, the computer 105 can send a message to one or more other vehicles 101 in the roadway lane indicating that the vehicle 101 is moving in the wrong direction in the roadway lane to mitigate a potential collision between the vehicles 101.

Figure 2:
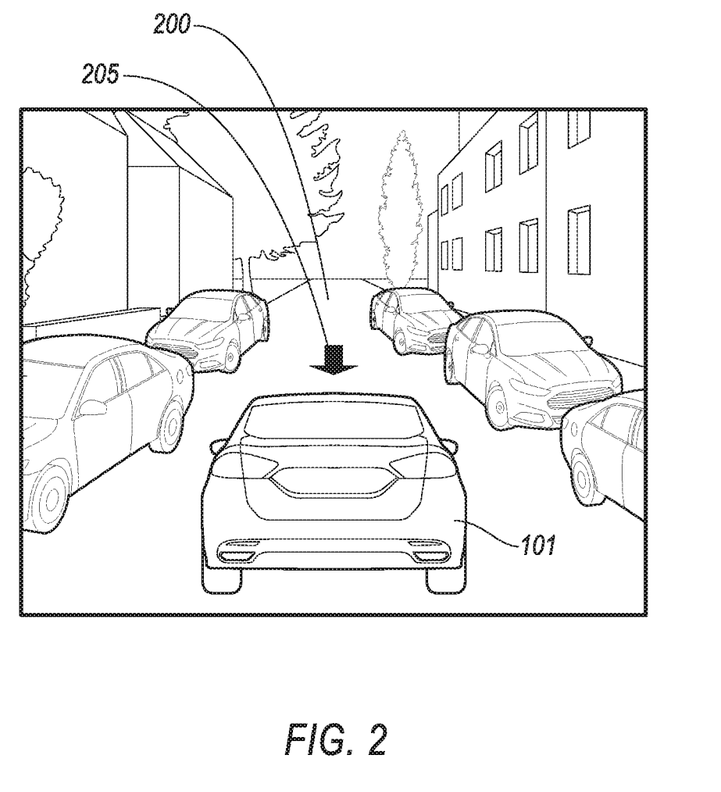
FIG. 2 illustrates identifying the lane direction by detecting a marking.

FIG. 2 illustrates an example roadway lane 200. The roadway lane 200 can include one or more markings 205. The markings 205 convey information about the roadway lane 200 to users of vehicles 101. For example, the markings 205 can indicate whether the roadway lane 200 is a dedicated turn lane 205, e.g., vehicles 101 are only permitted to perform a certain turn at an intersection when the vehicles 101 are in the roadway lane 200. In another example, the markings 205 can indicate a direction of traffic in the roadway lane 200. That is, if the roadway lane 200 is on a one-way street, the markings 205 can indicate the direction of the one-way street.

The computer 105 can detect the markings 205 to determine the lane direction of the roadway lane 200. The computer 105 can actuate one or more sensors 110, e.g., a camera, to collect data 115 about the markings 205. The computer 105 can, based on the data 115, determine whether the markings 205 indicate the lane direction. For example, as shown in FIG. 2, the markings 205 show an arrow indicating the lane direction. Thus, vehicles 101 moving in the direction indicated with the arrow move in the lane direction. The computer 105 can capture an image of the markings 205 and determine the direction indicated by the markings 205. For example, the computer 105 can compare the image to a known image of an arrow using known image processing techniques, e.g., a Hough transformation, a Fourier descriptor, a Canny edge detector, etc. That is, the computer 105 compares the collected data 115 to stored known shapes in the data store 106 and/or the server 130 to identify portions of the images in the data 115 as markings 205. The computer 105 can compare the direction indicated by the markings 205 to the current trajectory of the vehicle 101 to determine whether the vehicle 101 is moving in the same direction as the lane direction. If the direction of the vehicle 101 differs from the lane direction, the computer 105 can actuate one or more countermeasures, as described above.

Figure 3A:
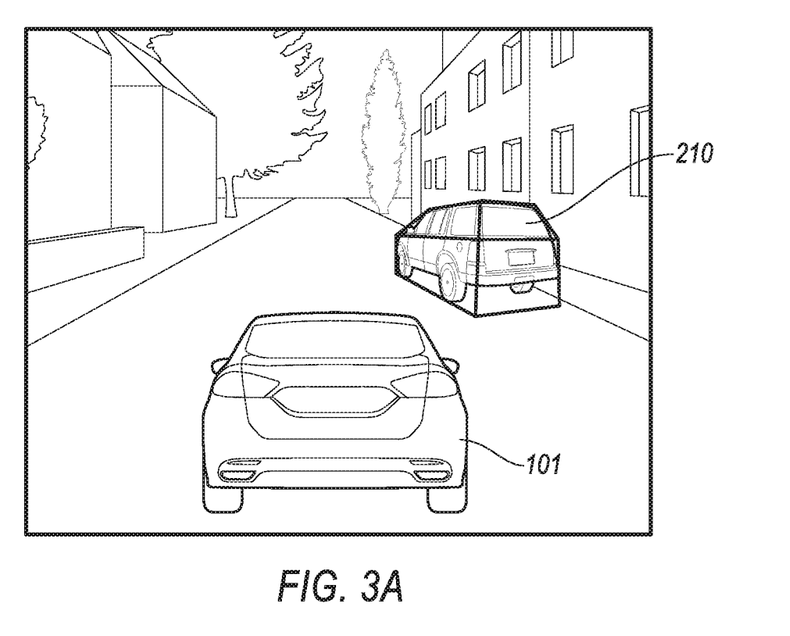
FIGS. 3A-3B illustrate identifying the lane direction by detecting shapes of a parked vehicle.
Figure 3B:
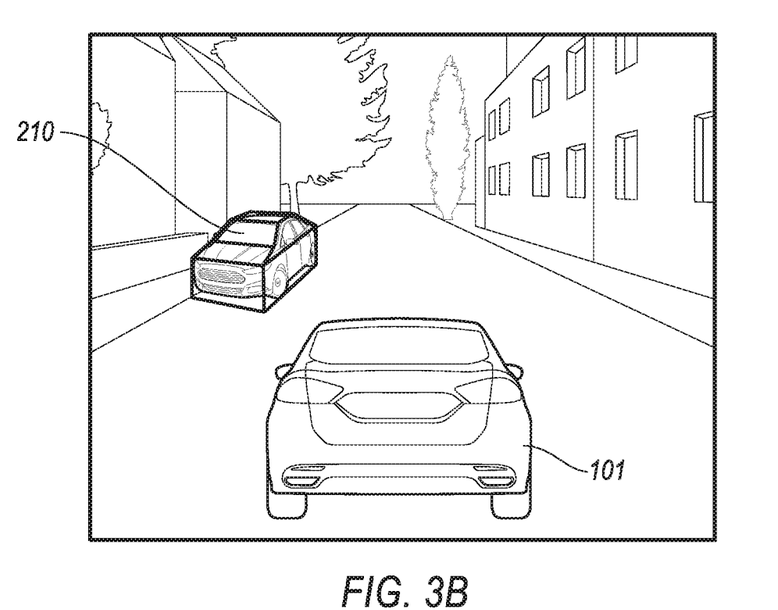

FIGS. 3A-3B illustrate the computer 105 identifying one or more parked vehicles 210 to determine the lane direction. When travelling in the roadway lane 200, the computer 105 can actuate one or more sensors 110 to collect data 115, e.g., visual data from a camera, radar data from a radar, lidar data from a lidar, etc., and based on the data 115, the computer 105 can identify the parked vehicles 210. The computer 105 can determine the lane direction based on a direction that the parked vehicles 210 face. That is, parked vehicles 210 typically face in line with the lane direction of a roadway lane 200. Thus, when the computer 105 determines the facing direction of the parked vehicles 210, the computer 105 can determine whether the vehicle 101 is moving with the lane direction.

The computer 105 can determine the direction that the parked vehicles 210 face based on image data 115 of the parked vehicles 210. The computer 105 can instruct a camera 110 to capture an image of one of the parked vehicles 210. The computer 105 can divide the image of the parked vehicle 210 into a plurality of polygonal shapes, e.g., a plurality of rectangles, using known image processing techniques, that approximate the outline of the parked vehicle 210. That is, the computer 105 can associate one or more geometric shapes with the parked vehicle 210. According to one example, at least a portion of each of the geometric shapes can be mapped to overlay a peripheral outline of a rear view of the parked vehicle 210. According to other examples, any features viewable from the forward-looking sensor 110 may be mapped; e.g., outlining all or a portion of one or more of the rear indicator lamps, a rear window, a license plate, etc. For example, a front hood of the parked vehicle 210 can be mapped as a parallelogram, a windshield of the parked vehicle 210 can be mapped as a trapezoid, and a front end of the parked vehicle 210 can be outlined as a rectangle. In another example, a rear window of the parked vehicle 210 can be outlined as a trapezoid and a rear end of the parked vehicle 210 can be outlined as a rectangle.

Based on the combination of shapes identified to outline the parked vehicle 210, the computer 105 can identify the direction that the parked vehicle 210 is facing. For example, if the computer 105 identifies a parallelogram between a trapezoid and a rectangle, the computer 105 can determine that the parallelogram represents a front hood of the parked vehicle 210 and that the parked vehicle 210 is facing the vehicle 101. Thus, the lane direction, which is in line with the forward direction of the parked vehicle 210, is opposite to the direction of travel of the vehicle 101. Alternatively or additionally, the computer 105 can identify the direction of the parked vehicle 210 based on the number of shapes identified. For example, the computer 105 can identify 3 shapes and associate 3 identified shapes with a front-facing parked vehicle 210, e.g., the 3 shapes correspond to a front bumper, a front hood, and a windshield of the parked vehicle 210. When the computer 105 identifies only 1 or 2 shapes, the computer 105 can determine that the parked vehicle 210 is rear-facing, e.g., the 1 or 2 shapes correspond to a rear window and/or a rear trunk lid.

In another example, the computer 105 can estimate the areas of the identified shapes and determine the facing direction of the parked vehicle 210 based on the ratio of the areas of the shapes using known techniques. For a typical vehicle 101, 210, the shapes identified for front-facing components, e.g., the hood, the windshield, the grill, etc., have approximately the same area. Thus, when the ratio of the areas of two of the shapes is approximately 1, the computer 105 can determine that the front end of the parked vehicle 210 is facing the vehicle 101, and thus the vehicle 101 is moving against the lane direction. Furthermore, the shapes identified for rear-facing components can have a ratio of areas of about 2, i.e., the rear hood is typically has an area twice of other rear-facing parts, e.g., the rear bumper, the area beneath the rear bumper, etc. Thus, when the ratio of the areas of two of the shapes is approximately 2 (or ½), the computer 105 can determine that the rear end of the parked vehicle 210 is facing the vehicle 101, and thus the vehicle 101 is moving along the lane direction.

Further, the illustrated polygonal shapes and the quantity thereof are exemplary. For example, a single geometric shape may be used; or more than two geometric shapes could be used. Non-limiting examples of suitable geometric shapes include rectangles, ellipses, triangles, trapezoids, and other polygons. According to at least one example, the mapping of two or more geometric shapes to parked vehicle 210 can provide redundancy and avoid computational confusion with information pertaining to other environmental objects which may be mapped in a similar manner.

As used herein, the term "mapping" in the context of mapping shapes includes executing programming in the computer 105 to associate one or more predetermined geometric shapes (e.g., such as one or more rectangles, ellipses, triangles, trapezoids, or other polygons) with one or more features of the parked vehicle 210 and, in response to the association, then assign the one or more predetermined geometric shapes to those portions. For example, the computer 105 can associate a parallelogram shape with a front hood of the parked vehicle 210. The one or more features are not required to define the peripheral outline of the parked vehicle 210; however, in at least one example, the predetermined geometric shapes can collectively overlay at least 25% of the outline. Geometric shapes could be used in other ways as well. For example, one or more geometric shapes can be used that entirely encloses or circumscribes the peripheral outline of the parked vehicle 210.

Figure 4A:
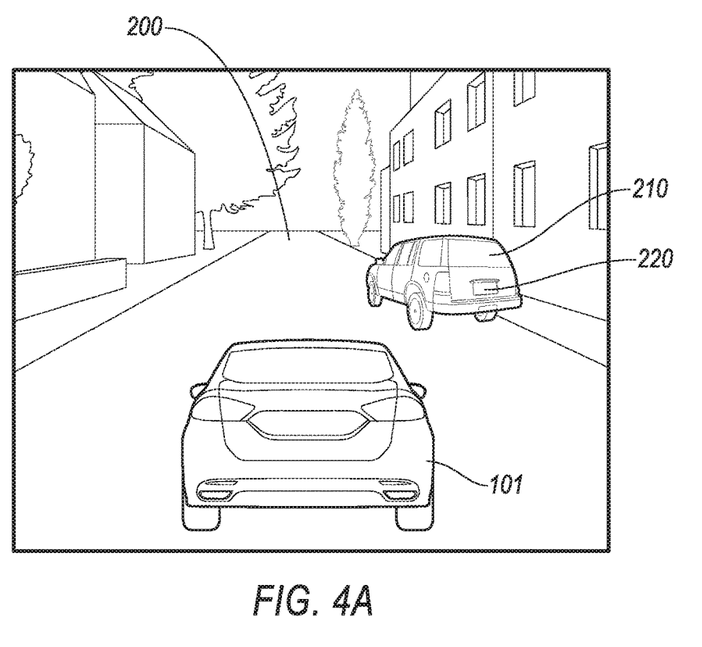
FIGS. 4A-4B illustrate identifying the lane direction by detecting front and rear features of the parked vehicle.
Figure 4B:
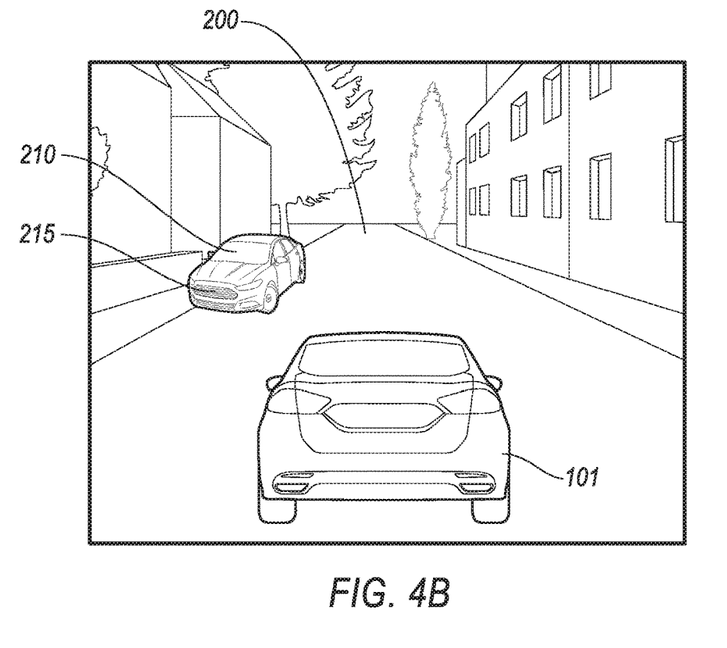

FIGS. 4A-4B illustrate the computer 105 identifying one or more parked vehicles 210 to determine the lane direction based on and front-facing features 215 and rear-facing features 220. Based on the direction that the parked vehicle 210 faces, the computer 105 can capture image data 115 of either front-facing features 215 of the parked vehicle 210, as shown in FIG. 4B, or rear-facing features 220 of the parked vehicle 210, as shown in FIG. 4A. As used herein, a "feature" of the parked vehicle 210 is a component 120 or a portion of the parked vehicle 210 viewable when viewing an exterior of the parked vehicle 210. That is, the parked vehicle 210 can have identifiable features that are typically viewable on one of a front end and a rear end of the parked vehicle 210. Features that are typically viewable on the front end are herein defined as "front-facing features" 215, and features that are typically viewable on the rear end are herein defined as "rear-facing features" 220. Example front-facing features 215 include, e.g., a grill, a grill shutter, a front windshield, a fog lamp, a side mirror, etc. Example rear-facing features 220 include, e.g., a license plate, an exhaust pipe, a trunk lid, a gasoline gate, a model identifier, a rear windshield, etc.

The computer 105 can identify the front-facing features 215 and the rear-facing features 220 based on image data 115 of the parked vehicle 210. That is, the computer 105 can compare the image data 115 to a stored image from, e.g., the data store 106, the server 130, etc., of known front-facing features 215 and rear-facing features 220. Using known image processing techniques, the computer 105 can identify whether the image data 115 includes one of the front-facing features 215 or one of the rear-facing features 220.

The computer 105 can determine the direction of the parked vehicle 210 based on at least one of an identified rear-facing feature 220 and an identified front-facing feature 215. That is, upon collecting the data 115 from the camera 110, the computer 105 can determine whether the image includes a front-facing feature 215 or a rear-facing feature 220. If the image includes a front-facing feature 215, as shown in FIG. 4B, then the host vehicle 101 is moving opposite the direction of the parked vehicle 210, and thus the host vehicle 101 is moving opposite the lane direction. If the image includes a rear-facing feature 220, as shown in FIG. 4A, then the host vehicle 101 is moving in the same direction that the parked vehicle 210 is facing, and thus the host vehicle 101 is moving in the lane direction.

In another example, the computer 105 can identify a side mirror of the parked vehicle 210 and determine the direction of the parked vehicle 210 based on the distance between the side mirror and each of the ends of the parked vehicle 210. Using the image-processing techniques described above, the computer 105 can identify the side mirror and the ends of the parked vehicle 210. The computer 105 can identify a distance between the side mirror each of the ends of the parked vehicle 210. That is, based on the position of the parked vehicle 210 relative to the vehicle 101, the computer 105 can estimate the distances between the side mirror and each of the ends of the parked vehicle 210. The computer 105 can compare the distances between the side mirror and the ends and determine the facing direction of the parked vehicle 210. In a typical vehicle 101, 210, the side mirror is closer to the front end than the rear end, i.e., the distance between the side mirror and the front end of the vehicle is less than the distance between the side mirror and the rear end of the parked vehicle 210. Thus, the computer 105 can compare the determined distance between the side mirror and the end of the parked vehicle 210 closest to the vehicle 101 to the determined distance between the side mirror and the end of the parked vehicle 210 farthest from the vehicle 101. If the distance between the side mirror and the end closest to the vehicle 101 is greater than the distance between the side mirror and the end farthest from the vehicle 101, then the computer 105 can determine that the end closest to the vehicle 101 is the rear end of the parked vehicle 210, and the vehicle 101 is moving along the lane direction. Otherwise, the computer 105 can determine that the end closest to the vehicle 101 is the front end of the parked vehicle 210, and thus the vehicle 101 is moving against the lane direction.

Figure 5A:
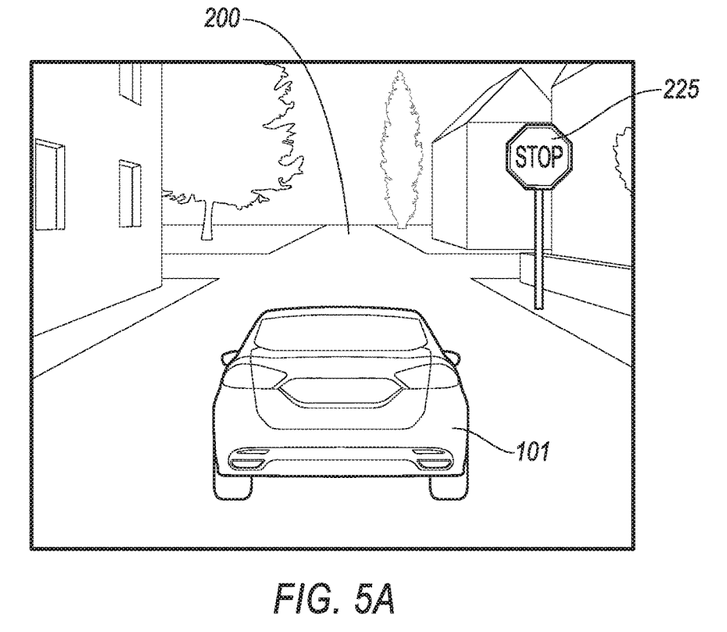
FIGS. 5A-5B illustrate identifying the lane direction by detecting a traffic sign.
Figure 5B:
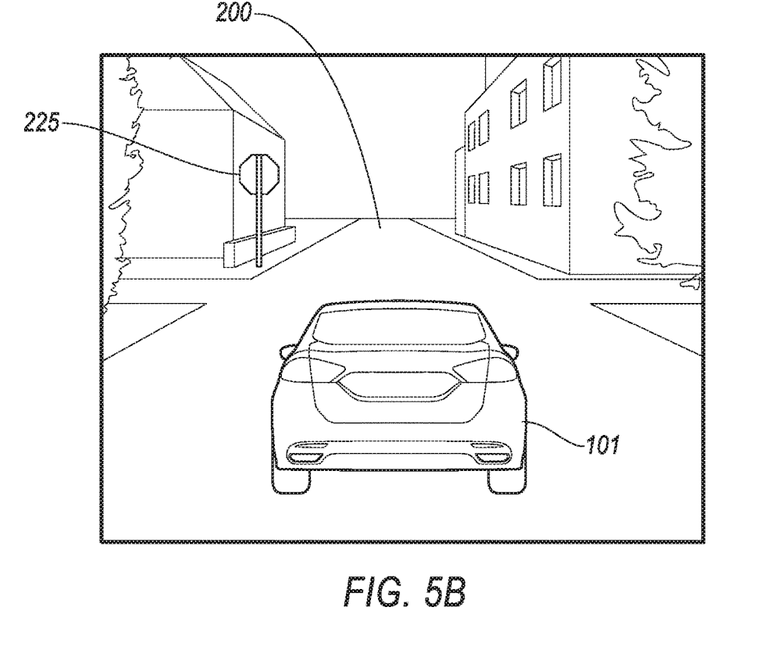

FIGS. 5A-5B illustrate the computer 105 identifying the lane direction based on a traffic sign 225. The traffic sign 225 can include content, e.g., a phrase, a symbol, etc., that indicates information about the roadway lane 200. For example, as shown in the example of FIGS. 5A-5B, the traffic sign 225 can be a stop sign, and the content can be the word "STOP". Additionally or alternatively, the traffic sign 225 can be, e.g., a yield sign, a "no turn on red" sign, a "turn only" sign, etc., and can include content to inform vehicle 101 operators of the information presented by the traffic sign 225.

The traffic sign 225 can be positioned so that operators of vehicles 101 that are moving along the lane direction can read the content of the traffic sign 225 (as shown in FIG. 5A) while operators of vehicles 101 that are moving opposite the lane direction cannot read the content of the traffic sign 225 (as shown in FIG. 5B). Thus, the computer 105 can identify the lane direction based on whether image data 115 of the traffic sign 225 shows the content of the traffic sign 225. For example, the computer 105 compare predetermined images of a plurality of traffic signs 225 in, e.g., the data store 106, the server 130, etc. The computer 105 can capture image data 115 of the traffic sign 225 and compare, using known image processing techniques, the current image data 115 to the predetermined images. When the comparison indicates that the current image data 115 includes the content of the traffic sign 225, the computer 105 can determine that the vehicle 101 is moving along the lane direction. When the comparison indicates that the current image data 115 lacks the content of the traffic sign 225, the computer 105 can determine that the vehicle 101 is moving opposite the lane direction.

Figure 6:
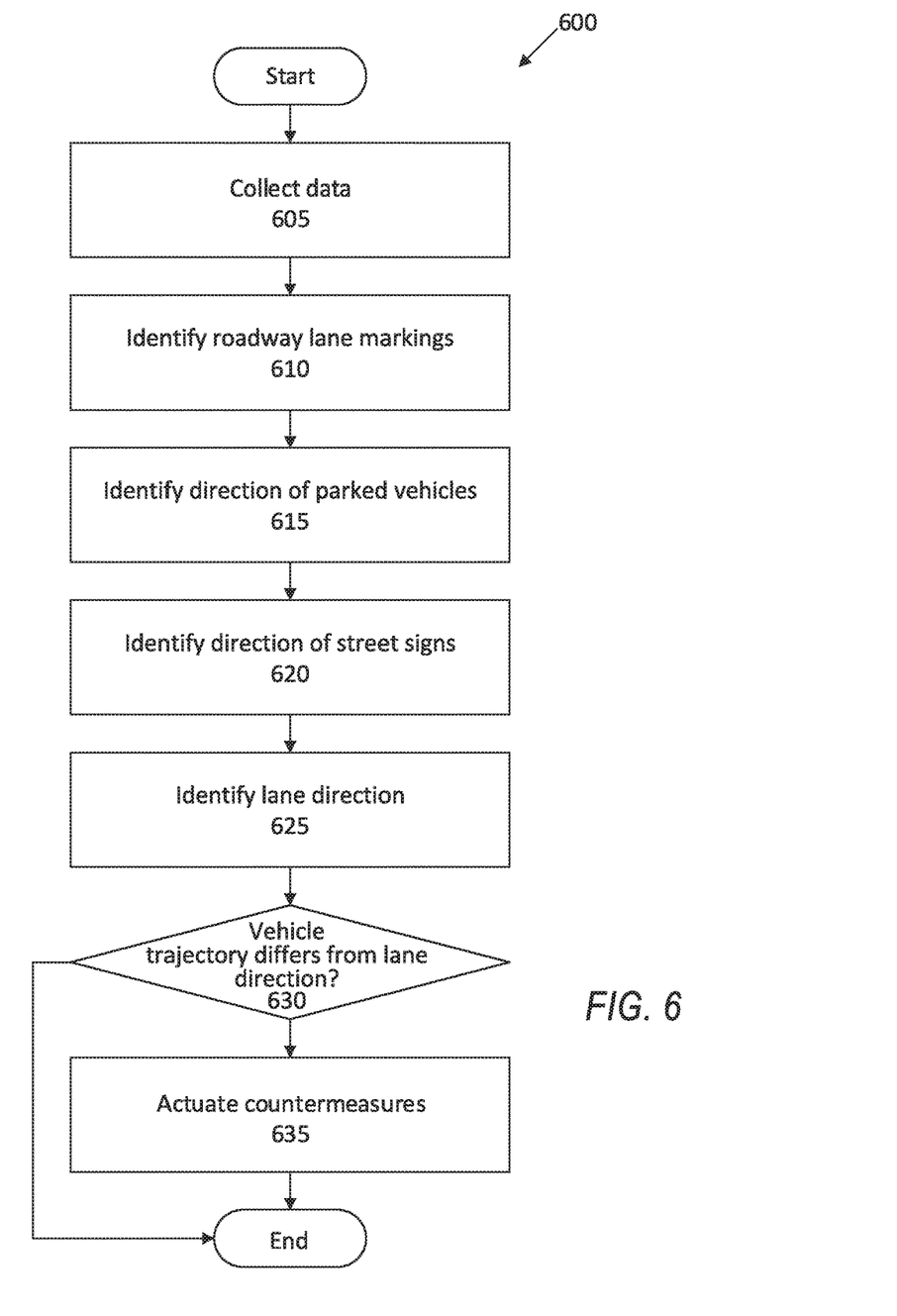
FIG. 6 is a block diagram of an example process for identifying the lane direction.

FIG. 6 illustrates an example process 600 for identifying a direction of a roadway lane 200. The process 600 starts in a block 605, in which the computer 105 collects data 115 from one or more sensors 110. As described above, the computer 105 can collect, e.g., visual data 115 with a camera 110, lidar data 115 with a lidar 110, etc.

Next, in a block 610, the computer 105 identifies one or more markings 205 in the roadway lane 200 from the collected data 115. That is, the computer 105 can use known image-processing techniques to determine whether the data 115 indicate the markings 205. The markings 205 can indicate the direction of the roadway lane 200 and can include, e.g., an arrow, a phrase, etc.

Next, in a block 615, the computer 105 identifies one or more parked vehicles 210 and identifies the direction that each parked vehicle 210 is facing. As described above, the computer 105 can use known image-processing techniques to analyze the image data 115 of the parked vehicles 210 and determine the direction that each parked vehicle 210 is facing. For example, the computer 105 can detect a number of shapes captured by the camera 110, as described above. In another example, the computer 105 can identify one or more front or rear features 215, 220 of the parked vehicle 210 to determine the direction of the parked vehicle 210.

Next, in a block 620, the computer 105 identifies a direction that a street sign 225 faces. As described above, the street sign 225 is designed to show the content of the street sign 225 when viewed in the lane direction and not to show the content when viewed in the opposite direction. Thus, the street sign 225 is designed to convey information for vehicles 101 traveling in the lane direction. The computer 105 can capture data 115 about the street sign 225 and, using known image-processing techniques, determine whether the computer 105 can detect the content of the street sign 225 to determine the lane direction.

Next, in a block 625, the computer 105 identifies the lane direction. That is, based on the markings 205, the parked car 210, and the traffic sign 225, the computer 105 determines the lane direction for the roadway lane 200. For example, when the markings 205 include an arrow pointing in the lane direction, the image data 115 of the parked car 210 includes one or more rear-facing features 220, and the image data 115 of the traffic sign 225 includes the content of the traffic sign 225, the computer can determine that the lane direction is forward relative to the vehicle 101.

Next, in a block 630, the computer 105 determines whether the trajectory of the vehicle 101 differs from the lane direction. That is, the computer 105 determines whether the vehicle 101 is moving along the lane direction or away from the lane direction by more than a threshold, indicating that the vehicle 101 is moving in the wrong direction in the roadway lane 200. As described above, when the trajectory of the vehicle 101 is within the threshold of the lane direction, the computer 105 can determine that the vehicle 101 is moving with the flow of traffic, i.e., the trajectory of the vehicle 101 does not differ from the lane direction. When the trajectory of the vehicle 101 exceeds the threshold, the computer 105 can determine that the vehicle 101 is moving along the lane direction. If the computer 105 determines that the vehicle 101 is moving along the lane direction, the process 600 ends. If the computer 105 determines that the trajectory of the vehicle 101 differs from the lane direction, the process 600 continues in a block 635.

In the block 635, the computer 105 actuates one or more countermeasures. As described above, the countermeasures are specific actuations of one or more vehicle components 120 that mitigate vehicle 101 operation opposite the lane direction. The countermeasures can include, e.g., shifting a gear selector into a reverse position, applying a brake, sending a message to the owner of the vehicle 101 over the network 125, etc. Following the block 635, the process 600 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 600, one or more of the steps could be omitted, or the steps could be executed in a different order than shown in FIG. 6. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory including instructions executable by the processor to:
   identify a roadway lane direction based on vehicle sensor data indicating a direction of a parked vehicle based on a combination of mapped polygonal shapes outlining an image of the parked vehicle; and
   determine that a trajectory of a vehicle differs from the roadway lane direction and then actuate a vehicle component.

2. The system of claim 1, wherein the instructions further include instructions to determine the direction of the parked vehicle based on at least one of a rear-facing feature and a front-facing feature of the parked vehicle.

3. The system of claim 1, wherein the vehicle sensor data include a current image of a traffic sign and where the computer has a predetermined image of the traffic sign stored in the memory, wherein the instructions further include instructions to determine a direction of the traffic sign based on a comparison of the predetermined image of the traffic sign and the current image of the traffic sign.

4. The system of claim 1, wherein the vehicle sensor data include a current image of a traffic sign and the instructions further include instructions to identify the roadway lane direction from a direction of the traffic sign.

5. The system of claim 1, wherein the vehicle component is a hazard light.

6. The system of claim 1, wherein the vehicle component is a transmitter and the instructions further include instructions to send a message to an owner of the vehicle indicating that the trajectory of the vehicle differs from the roadway lane direction.

7. The system of claim 1, wherein the vehicle component is a brake or a gear selector.

8. The system of claim 1, wherein the vehicle component is a transmitter and the instructions further include instructions to send a message indicating the lane direction to another vehicle.

9. The system of claim 1, wherein the instructions further include instructions to return control of the vehicle component from the computer to a human operator upon determining that the trajectory of the vehicle differs from the roadway lane direction.

10. The system of claim 1, wherein the instructions further include instructions to identify the roadway lane direction based on the vehicle sensor data indicating a traffic sign.

11. The system of claim 1, wherein the instructions further include instructions to identify the roadway lane direction based on the vehicle sensor data indicating a marking on a surface of the roadway lane.

12. A method, comprising:
    identifying a roadway lane direction based on vehicle sensor data indicating a direction of a parked vehicle based on a combination of mapped polygonal shapes outlining an image of the parked vehicle; and
    determining that a trajectory of a vehicle differs from the roadway lane direction and then actuating a vehicle component.

13. The method of claim 12, further comprising determining the direction of the parked vehicle based on at least one of a rear-facing feature and a front-facing feature of the parked vehicle.

14. The method of claim 12, wherein the vehicle sensor data include a current image of a traffic sign and wherein a computer has a predetermined image of the traffic sign stored in a memory, the method further comprising determining the direction of the traffic sign based on a comparison of a predetermined image of the traffic sign and a current image of the traffic sign.

15. The method of claim 12, further comprising determining the lane direction based on a direction of a traffic sign.

16. The method of claim 12, wherein the vehicle component is a hazard light.

17. The method of claim 12, wherein the vehicle component is a transmitter and the method further comprising sending a message to an owner of the vehicle indicating that the trajectory of the vehicle differs from the roadway lane direction.

18. The method of claim 12, wherein the vehicle component is a brake or a gear selector.

19. The method of claim 12, wherein the vehicle component is a transmitter and the method further comprises sending a message indicating the lane direction to another vehicle.

20. The method of claim 12, further comprising returning control of the vehicle component from a computer to a human operator when the trajectory of the vehicle differs from the roadway lane direction.

* * * * *